UNITED STATES PATENT OFFICE.

ROMEO B. MARTIN AND EDWARD H. MARTIN, OF WEBSTER CITY, IOWA, ASSIGNORS OF ONE-HALF TO JACOB M. FUNK AND PERCIVAL KNOWLES, BOTH OF SAME PLACE.

WALL-COVERING COMPOSITION.

SPECIFICATION forming part of Letters Patent No. 427,591, dated May 13, 1890.

Application filed September 20, 1889. Serial No. 324,556. (No specimens.)

*To all whom it may concern:*

Be it known that we, ROMEO B. MARTIN and EDWARD H. MARTIN, citizens of the United States, residing at Webster City, in the county of Hamilton and State of Iowa, have invented certain new and useful Improvements in Wall-Covering Composition; and we do hereby declare the following to be a full, clear, and exact description of the invention, such as will enable others skilled in the art to which it appertains to make and use the same.

Our invention relates to a wall-covering composition, which will be hereinafter described and claimed.

One of the most serious practical objections to the use of sulphate of lime or the common plaster-of-paris is its tendency to quickly harden or set in a short time after it has been reduced to a plastic state convenient for application to a wall or other surface by the workman; and it is the object of our invention to overcome this objection by restraining or retarding the setting or hardening of the composition after it has been reduced to a plastic state for such a length of time as may be convenient for the proper compounding of the mixture and its application to a wall or other surface.

Our invention consists in the use of citric acid, either in the commercial form or in crystals, or the extract or juice of lemons or limes, or other fruit juices containing citric acid in large proportions combined with sulphate of lime and sand, although other ingredients may be used in addition to the sulphate of lime and sand to constitute the body of the covering or compound proper. We have discovered that the addition of citric acid in either of the forms above referred to serves efficiently to retard or restrain the hardening or setting of the compound for a limited time, and that beneficial and advantageous results are secured even though so small a proportion as one-half an ounce of citric acid is employed to one hundred pounds of sulphate of lime and sand.

In the practice of our invention we first take sulphate of lime and sand in the proportions of thirty-three and one-third (33⅓) pounds of sulphate of lime to sixty-six and two-thirds (66⅔) pounds of sand, although the proportions of the sulphate of lime to the sand may be greater or less than one-third of lime to two-thirds of the sand in each one-hundred pounds. To the sand and sulphate of lime we add a small quantity of citric acid and a sufficient quantity of water to reduce the mass to a plastic state. The whole mass is then thoroughly mixed or kneaded by any suitable means until it reaches such a state of plasticity that it is suitable for application to a wall and can be conveniently handled and worked. The proportion of citric acid to the one hundred pounds of sulphate of lime and sand may be as small as one-third or one half an ounce of citric acid, which quantity of the acid will serve to efficiently retard the setting of the mixture for the period of one-half an hour, which length of time is ordinarily sufficient for the proper compounding of the mixture and its application to the wall, &c.; but if it is desired to retard the hardening of the composition for a longer period of time the proportion of citric acid to the one hundred pounds of sulphate of lime and sand may be increased according to the length of time it is desired to retard the setting or hardening of the mixture—as, for example, three or four ounces of the citric acid to the one hundred pounds will retard setting of the compound for three or four hours.

In practice we prefer to use the citric acid in the well-known commercial form and to place it in the water before the latter is poured into or upon the sulphate of lime and sand; but the crystallized citric acid in a dry state may also be employed with equally good results, in which case the crystals may either be dissolved in the water and the solution of water and acid introduced into the lime and sand or the crystals of citric acid in a dry state may be mixed mechanically with the lime and sand before the water is introduced, or the extract or juice of lemons, limes, or other fruits containing the citric acid in sufficient quantities may be employed.

As a suitable vehicle for the citric acid, brick-dust, flour, starch, or clay may be employed with the citric acid, thus enabling it to be transported or shipped in a condition to be readily combined with the sand, lime, and water.

We are aware that glue, acetic acid, muriatic acid, and other substances have been used as retarders for plastering compounds; but as glue is the substance which is in common use for retarding the setting of the plaster we will state, briefly, some of the objections attending the use of this material.

It is well known that calcined plaster becomes inert and partly air-slaked when it is kept too long, or, as it is technically termed among masons, "dead-plaster." When glue, sand, and water are mixed with calcined plaster in this condition, the compound is very brittle and liable to break, is not sufficiently plastic and adhesive, it does not make a good wall surface or coating, cannot be worked well, and much of the material is wasted in the application to walls. In some instances as much as three parts of calcined plaster to one part of sand are required with this air-slaked plaster, whereas the usual proportion of calcined plaster is one part of the plaster to two parts of the sand; but even with this excessive amount of plaster the resulting compound is unsatisfactory, for the reasons above stated.

When partly-inert or air-slaked calcined plaster of the nature above described is mixed with citric acid, sand, and water, the calcined plaster is revived by the action of the citric acid thereon, and the compound resulting from this combination of ingredients is nearly as tough, plastic, and rich as when fresh calcined plaster is used. This composition makes a firm hard wall. It can be easily worked and applied, and does not waste in application to a wall.

We have found that citric acid as a retarder for plastering compounds is superior to any known retarder in practical use, and this is especially the case when such acid is used in connection with dead or inert calcined plaster.

Another advantage arising from the use of citric acid is that it makes the composition "fatter" and "richer," as technically called by masons; or, in other words, the composition is more adhesive or sticky, it has more plasticity than when other retarders are used, and it is tougher and molds itself in solid lumps behind the lath which are not liable to break off.

Mortar or a wall-covering composition which is not tough and plastic is wasted, as it breaks off after it has been forced through the interstices of the lath and falls down behind the lath, and more of the composition has to be applied in order to secure a good surface, and if the composition does not clutch properly it will not adhere to the lath, and is easily jarred off. By the use of citric acid in the wall-covering composition we are enabled to produce an improved compound which possesses the requisite qualifications for a good wall-covering, which is tough and clinches the lath firmly and properly adheres thereto, is tough and plastic, so as to mold itself in lumps behind the lath, and will not drop down behind the lath, and it can be easily worked and applied.

As compared with glue and other known retarders, citric acid is very much cheaper. When glue is used as a retarder, it must be melted at the time the composition is prepared, and it must be used at once; otherwise it will decay in warm weather and thicken and become like a jelly in cold weather. Besides, the smell of the glue is offensive as well when it is melted and the composition is applied to the wall.

The citric acid is cheaper, cleanly, has no offensive odor, and it is easily dissolved in water and mixed with the composition.

Having thus fully described our invention, what we claim as new, and desire to secure by Letters Patent, is—

A composition for covering walls and other surfaces, consisting of citric acid as a retarder, sulphate of lime, sand, and water, in substantially the proportions specified, for the purpose set forth.

In testimony whereof we affix our signatures in presence of two witnesses.

ROMEO B. MARTIN.
EDWARD H. MARTIN.

Witnesses:
CYRUS SMITH,
JACOB M. FUNK.